(12) United States Patent
Lewis et al.

(10) Patent No.: US 11,111,951 B2
(45) Date of Patent: Sep. 7, 2021

(54) COMPOSITE SHAFT ARRANGEMENT WITH LOAD INTRODUCTION ELEMENTS

(71) Applicant: LENTUS COMPOSITES LIMITED, Banbury Oxfordshire (GB)

(72) Inventors: Paul Anthony Lewis, Eynsham Oxfordshire (GB); Michael James Dewhirst, Eynsham Oxfordshire (GB)

(73) Assignee: Lentus Composites Limited, Banbury (GB)

( * ) Notice: Subject to any disclaimer, the term of this patent is extended or adjusted under 35 U.S.C. 154(b) by 793 days.

(21) Appl. No.: 15/575,451

(22) PCT Filed: May 17, 2016

(86) PCT No.: PCT/GB2016/051419
§ 371 (c)(1),
(2) Date: Nov. 20, 2017

(87) PCT Pub. No.: WO2016/185199
PCT Pub. Date: Nov. 24, 2016

(65) Prior Publication Data
US 2018/0163772 A1    Jun. 14, 2018

(30) Foreign Application Priority Data
May 18, 2015    (GB) ..................... 1508536

(51) Int. Cl.
*B29C 70/86* (2006.01)
*B29C 70/68* (2006.01)
(Continued)

(52) U.S. Cl.
CPC ............ *F16C 3/026* (2013.01); *B29C 70/681* (2013.01); *B29C 70/86* (2013.01);
(Continued)

(58) Field of Classification Search
CPC .. F16C 3/026; F16C 2220/28; F16C 2208/02; F16C 2326/06; B29C 70/681;
(Continued)

(56) References Cited

U.S. PATENT DOCUMENTS 2,573,361 A    10/1951  Rodgers, Jr. et al.
3,850,722 A    11/1974  Kreft
(Continued)

FOREIGN PATENT DOCUMENTS

DE    29614242    10/1996
EP    2184441     5/2010
(Continued)

OTHER PUBLICATIONS

International Search Report for PCT/GB2016/051419, Completed by the European Patent Office on Sep. 12, 2016, 6 Pages.
(Continued)

*Primary Examiner* — Sarang Afzali
*Assistant Examiner* — Darrell C Ford
(74) *Attorney, Agent, or Firm* — Brooks Kushman P.C.

(57) ABSTRACT

A method of manufacture of a shaft including positioning a prefabricated wedge member onto a cylindrical mandrel, winding a fibre material onto the mandrel, the fibre material extending over at least a part of the wedge member, allowing a matrix material impregnated into the fibre material to cure, and machining away at least part of the fibre material in the region of the wedge member to expose fibres thereof.

6 Claims, 6 Drawing Sheets

(51) Int. Cl.
   *B29K 705/00* (2006.01)
   *F16C 3/02* (2006.01)
   *B29L 31/00* (2006.01)

(52) U.S. Cl.
   CPC ....... *B29K 2705/00* (2013.01); *B29L 2031/75* (2013.01); *F16C 2208/02* (2013.01); *F16C 2220/28* (2013.01); *F16C 2326/06* (2013.01)

(58) Field of Classification Search
   CPC . B29C 70/86; B29K 2705/00; B29L 2031/75; Y10T 29/49801; Y10T 29/49808; Y10T 29/4998; Y10T 29/49982; Y10T 29/49888; Y10T 29/49904
   USPC ......... 29/419.1, 422, 527.1, 527.2, 460, 469
   See application file for complete search history.

(56) References Cited

U.S. PATENT DOCUMENTS

| | | | |
|---|---|---|---|
| 4,238,539 A | 12/1980 | Yates et al. | |
| 4,256,412 A * | 3/1981 | Tybus | B64C 13/30 403/267 |
| 4,774,043 A | 9/1988 | Beckmann | |
| 4,863,416 A | 9/1989 | Gupta | |
| 5,236,018 A | 8/1993 | Kobayashi et al. | |
| 5,318,374 A * | 6/1994 | Rumberger | F16B 4/006 403/277 |
| 8,251,830 B2 | 8/2012 | Schreiber et al. | |
| 8,302,754 B2 * | 11/2012 | Yagi | F16D 1/092 192/66.2 |
| 2001/0001769 A1 | 5/2001 | Kimoto et al. | |
| 2006/0258469 A1 * | 11/2006 | Dewhirst | F16D 1/072 464/181 |
| 2008/0012329 A1 * | 1/2008 | Dewhirst | F16D 1/072 285/382 |
| 2012/0060636 A1 * | 3/2012 | Dewhirst | F16C 7/026 74/473.36 |
| 2015/0343719 A1 * | 12/2015 | Hufenbach | B29C 70/446 264/511 |
| 2016/0230805 A1 * | 8/2016 | Busch | B29C 70/52 |
| 2017/0191520 A1 * | 7/2017 | Larson | F16D 1/033 |
| 2017/0210059 A1 * | 7/2017 | Pionetti | B29C 66/1162 |
| 2017/0227058 A1 * | 8/2017 | Pollitt | B29C 67/0044 |
| 2021/0062860 A1 * | 3/2021 | Park | F16C 3/035 |

FOREIGN PATENT DOCUMENTS

| | | |
|---|---|---|
| FR | 2152289 | 4/1973 |
| GB | 2112689 | 7/1983 |
| GB | 2424464 | 9/2006 |
| GB | 2435317 | 8/2007 |
| GB | 2473007 | 3/2011 |
| JP | S5993507 | 5/1984 |
| WO | 9322127 | 11/1993 |
| WO | 2004097233 | 11/2004 |

OTHER PUBLICATIONS

NTIS Tech Notes, US Department of Commerce Sep. 1, 1990, p. 730, XP000162559, "Preloaded Composite-Strut/End-Fitting Joint".

* cited by examiner

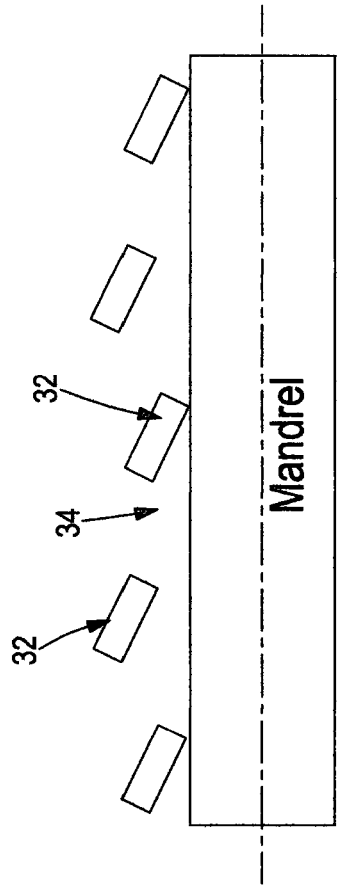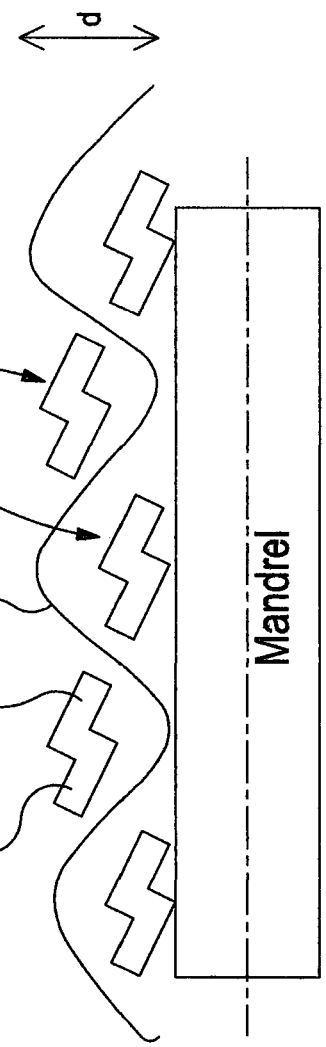

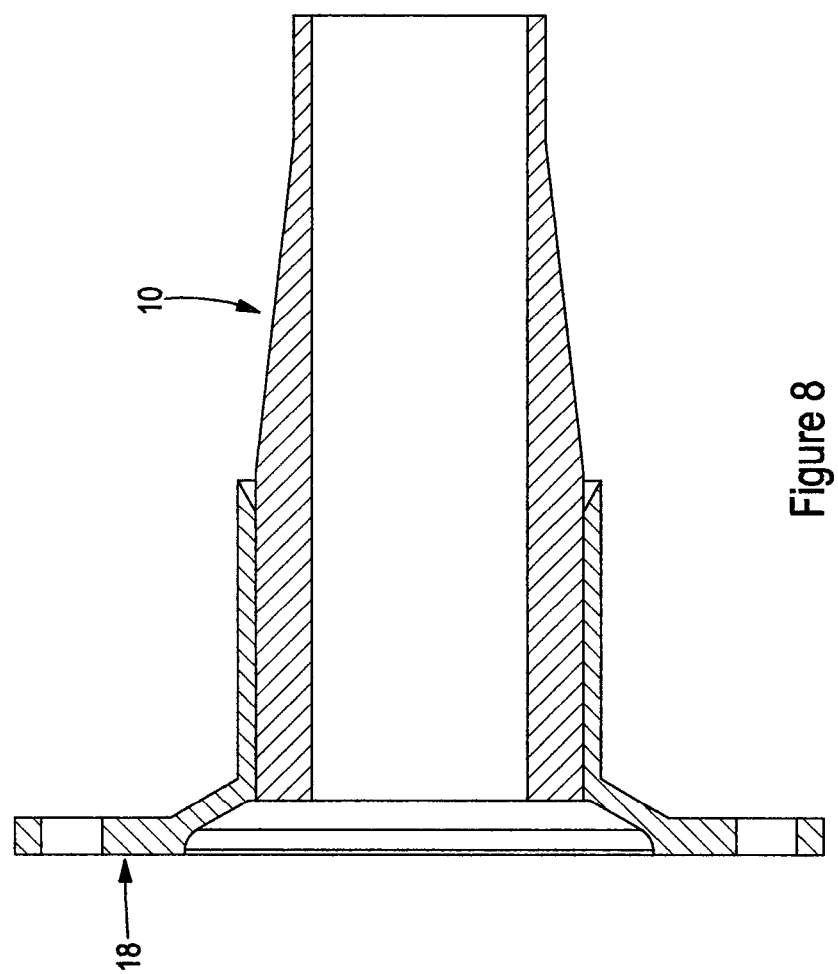

COMPOSITE SHAFT ARRANGEMENT WITH LOAD INTRODUCTION ELEMENTS

CROSS-REFERENCE TO RELATED APPLICATIONS

This application is the U.S. national phase of PCT Application No. PCT/GB2016/051419 filed on May 17, 2016, which claims priority to GB Patent Application No. 1508536.8 filed on May 18, 2015, the disclosures of which are incorporated in their entirety by reference herein.

TECHNICAL FIELD

This invention relates to a shaft arrangement, and in particular to a shaft arrangement comprising an elongate composite material shaft to an end of which an end component is fitted. By way of example, the shaft arrangement may be used as a rotary drive shaft or the like. It will be appreciated, however, that the invention is not restricted in this regard and may be employed in other applications.

BACKGROUND

GB2435317 describes a shaft arrangement in which an internally splined end component is fitted to an end of a composite material shaft to allow the attachment of the shaft to another device for torque transmission purposes. GB2424464 describes a composite material shaft to which such an end component may be fitted, the composite material shaft being manufactured by winding a wedge shaped layer of a fibre material onto a cylindrical mandrel, forming an outer layer of fibre material over the wedge shaped layer, impregnating the fibre materials with a matrix material that is allowed to cure, and then machining away part of the outer layer to expose plies of the fibre material of the outer layer before fitting the end component thereto. Such an arrangement is advantageous in that the transmission of torque loads between the end component and the material of the shaft is enhanced.

Whilst the arrangement of GB2424464 operates satisfactorily, it is thought that the accuracy and consistency with which shafts can be manufactured is relatively poor as a result of the location and geometry of the surface of the wedge shaped layer being difficult to accurately control. Consequently, significant variations may occur in the properties of the shafts manufactured using this technique.

SUMMARY

It is an object of the invention to provide a shaft arrangement and methods of manufacture thereof in which at least some of the disadvantages associated with known arrangements are overcome or are of reduced effect.

According to one aspect of the invention there is provided a method of manufacture of a shaft comprising positioning a prefabricated wedge member onto a cylindrical mandrel, winding a fibre material onto the mandrel, the fibre material extending over at least a part of the wedge member, allowing a matrix material impregnated into the fibre material to cure, and machining away at least part of the fibre material to expose fibres thereof.

The machining operation may be conducted upon the fibre material in the region of the wedge member to result in the shaft having a substantially cylindrical outer surface around which an end component be fitted. Alternatively, the machining operation may be conducted in such a manner as to allow a part of an end component to be located within an end part of the shaft, cooperating with the fibres to permit torque transmission therebetween.

The prefabricated wedge member is conveniently of metallic form, for example of steel or the like construction. It is preferably held captive by the fibre and matrix material of the shaft in the finished product.

It will be appreciated that the prefabricated wedge member may be manufactured to a high degree of accuracy and may be positioned upon the mandrel with a high degree of accuracy. As a consequence, the manufacture of the shaft can be achieved with improved consistency, reducing scrap. Furthermore, the prefabricated wedge member may be of good stiffness, better than is the case where a wedge shaped layer is wound as in the arrangement of GB2424464, and as a consequence the subsequent winding of the fibre material onto the mandrel and over at least a part of the wedge member need not be controlled taking into account the stiffness of the wedge member, simplifying the manufacturing process and providing a greater degree of flexibility in the manufacturing process. The geometry of the wedge member may be chosen to suit the application in which the shaft is to be used.

The method may further comprise the steps of introducing a plug, for example of tubular form, into an end part of the shaft, and fitting an end component around the end part of the shaft as mentioned hereinbefore. The end component may be, for example, of internally splined form, the splines of which cut into the material of the shaft upon the fitting of the end component to the shaft, the plug providing support for the end part of the shaft, accommodating the compressive loads applied thereto as a result of the presence of the end component fitted to the end of the shaft. Alternatively, as mentioned hereinbefore, part of an end component may be received within the end part of the tube.

In an alternative arrangement, the plug may be omitted, the dimensions of the prefabricated wedge member being such that it additionally provides the load bearing capacity otherwise provided by the plug.

According to another aspect of the invention there is provided a shaft manufactured using the method outlined hereinbefore.

There may be circumstances in which, in the event of a failure, it may be desirable for a drive shaft or the like to fracture or otherwise fail to prevent the continued application of torque between, for example, an engine and a gearbox or other device driven by the engine, such fracturing or failure occurring in a controlled manner in the event that the applied torque exceeds a predetermined level.

According to another aspect of the invention, therefore, there is provided a shaft arrangement comprising a composite material shaft, wherein an annular groove is machined into the outer surface of the shaft to form a region of the shaft of reduced, controlled torque transmitting capacity.

The dimensions of the shaft and the groove are chosen so that during normal use the shaft is able to transmit the desired torque loading. In the event that the torque loading exceeds a predetermined level determined by the design of the shaft and the dimensions of the groove, the shaft will fail at the location of the groove, preventing the continued transmission of torque by the shaft. In this manner, the level of applied torque at which the shaft will fail, and the point of failure, can be controlled with a greater degree of accuracy.

Where the shaft is manufactured using the method set out hereinbefore, then the groove may be formed in a part of the shaft overlying the wedge member. It will be appreciated, however, that this is merely one option and other locations for the groove are possible without departing from the scope of the invention.

Composite material shafts are typically formed of a number of material layers, the primary functions of which differ from one another. By way of example, the shaft may include a torque transmission layer, the primary function of which is to transmit torque between the end components fitted to the shaft and the characteristics such as fibre winding angle are chosen accordingly, and an outer layer designed to provide the shaft with a certain stiffness or other characteristics, for example to reduce whirl of the shaft in use. The groove may be extend into only the outermost one of the layers, or alternatively the depth of the groove may be such that it extends into at least a second one of the layers.

The level at which the shaft fails may be selected, depending upon the shaft design, to be slightly greater than a nominal mean strength of the shaft.

As an alternative to, or in addition to, the provision of a groove to control the level of torque that can be transmitted by a shaft, the shaft may, in accordance with another aspect of the invention, comprise a first part wound with fibres arranged at a first angle and a second part wound with fibres arranged at a second angle, the second angle being chosen to result in the second part of the shaft having a reduced torsional strength than the first part of the shaft. It will be appreciated that by controlling the angles of the fibres in this manner, a shaft may be produced in which the second part thereof will fail in the event that a torque level greater than a predetermined level is experienced.

Conveniently, the shaft may be manufactured by forming an elongate member comprising a series of first regions wound with fibres at the first angle and separated from one another by second regions wound with fibres at the second angle, a length of the elongate member being used in the formation of the shaft, the first regions forming the first parts of the shaft and the second regions forming the second parts of the shaft.

Another object of the invention is to provide a shaft arrangement of enhanced torque transmitting capabilities. Conventionally, a composite material shaft used in this type of application is composed of several differently wound and/or different material layers, the respective ones of the layers providing the shaft with different physical properties. By way of example, as mentioned hereinbefore, certain of the layers may, in use, constitute the primary torque transmitting part of the shaft, others of the layers providing the shaft with a desired level of stiffness and so restricting bending of the shaft, in use. A common failure mode in composite shafts arises from inter-lamina shear fatigue occurring between the plies forming the primary torque transmitting layer of the shaft. According to this aspect of the invention, there is provided a shaft arrangement comprising a primary torque transmitting layer, wherein the primary torque transmitting layer is composed of a single relatively thick ply. The single relatively thick ply is conveniently achieved by using an overlaid tow winding process to wrap at least partially overlapping warp tows onto a mandrel, the warp tows being interwoven with weft tows. In such an arrangement, the at least partial overlapping of the warp tows results in the through thickness of the weft tows being increased, and hence in the ply being of relatively thick form for a given fibre angle, material and the like. Not only does the increased thickness allow a single ply to be used in the formation of the torque transmitting layer, but it may also enhance the torque transmitting properties of the shaft by enhancing the cooperation between the fibres of the layer and the end component.

There is often a requirement for the end parts of a shaft to which end components are to be fitted to be of an increased outer diameter. The increased outer diameter may be achieved in several ways. By way of example, as mentioned in GB2424464, a wedge shaped layer may be provided over which an outer layer of the shaft may be wound. Alternatively, as described hereinbefore in accordance with the first aspect of the invention, a separate prefabricated wedge member may be used to achieve this result. In accordance with a further aspect of the invention, there is provided a shaft having an enlarged diameter region, wherein the enlarged diameter region is achieved only by varying the fibre angle at which fibre is wound onto the mandrel during the manufacture of the shaft, increasing the fibre angle whilst leaving other winding parameters unchanged. By increasing the fibre angle without changing any other winding parameters, the shaft diameter in the region of increased fibre angle will be increased compared to that elsewhere.

In each of the arrangements described hereinbefore, an end fitting cooperable with the outer surface of the shaft of cooperable with an inner surface thereof may be provided.

BRIEF DESCRIPTION OF THE DRAWINGS

The invention will further be described, by way of example, with reference to the accompanying drawings, in which:

FIG. 6a is a diagrammatic illustration of a typical winding process;

FIG. 6b is a view similar to FIG. 6a illustrating another embodiment of the invention;

FIG. 8 illustrates another embodiment of the invention.

DETAILED DESCRIPTION

Figure 1:
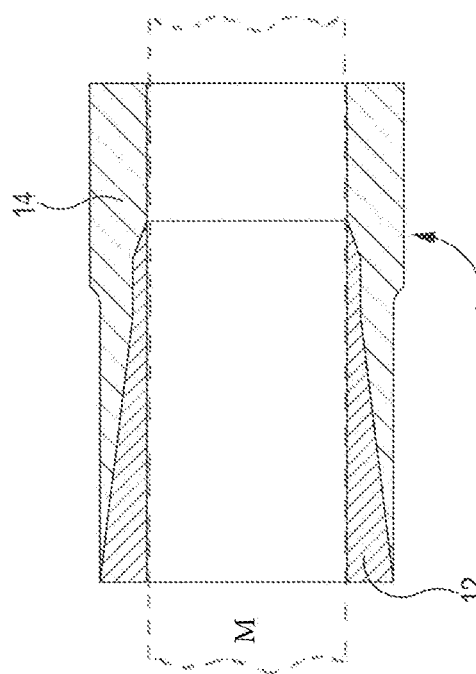
FIG. 1 is a sectional view illustrating part of a shaft in accordance with an embodiment of the invention.
Figure 2:
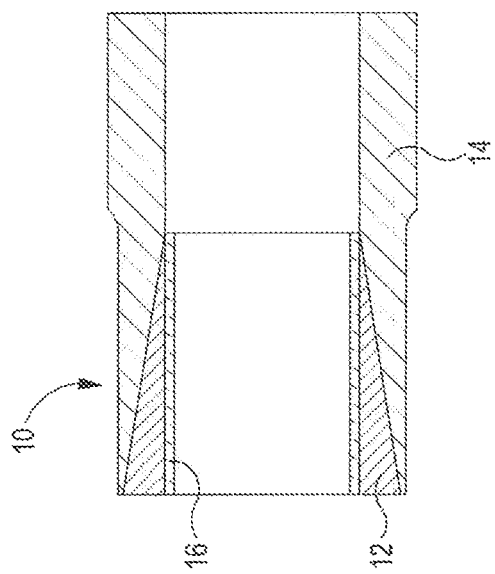
FIG. 2 is a view similar to FIG. 1 illustrating an alternative embodiment of the invention.

Referring firstly to FIG. 1, an end part of a shaft 10 is illustrated, the shaft 10 being intended for use as a drive shaft, transmitting torque between end components (not shown in FIG. 1) fitted to the ends of the shaft 10. The shaft 10 is of composite material form and is manufactured by positioning an annular member 12 of wedge shaped cross section (referred to hereinafter as a wedge member 12) onto a mandrel M as shown in FIG. 2. Once positioned upon the mandrel M in a desired position, a suitable fibre material is wound onto the mandrel, the fibre material extending over both the mandrel and at least part of the radially outer surface of the wedge member 12. It will be appreciated that the presence of the wedge member 12 results in the parts of the shaft defined by the fibre material wound upon the wedge member 12 being of increased diameter compared to the remainder of the shaft 10. The orientation of the fibres in this region is governed by the shape of the wedge member 12, and so is accurately controlled by accurate control over the shape of the wedge member 12.

After winding has been completed, the fibre material is impregnated with a suitable matrix material which is subsequently allowed to cure to form a solid composite 14. Alternatively, fibres that are pre-impregnated with the matrix material may be used. Once cured, at least part of the increased diameter part of the shaft 10 is machined away to expose at least some of the fibres thereof, forming the shaft 10 with an end part of cylindrical form and of a desired diameter.

Figure 4:
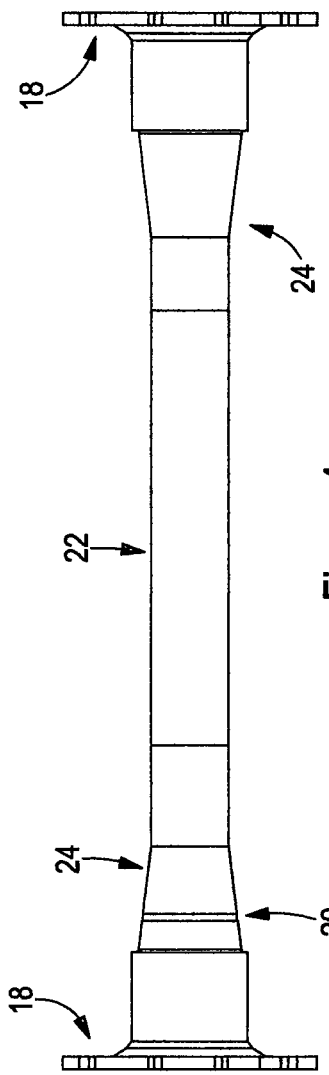
FIGS. 3 and 4 are views illustrating further alternative embodiments of the invention.
Figure 3:
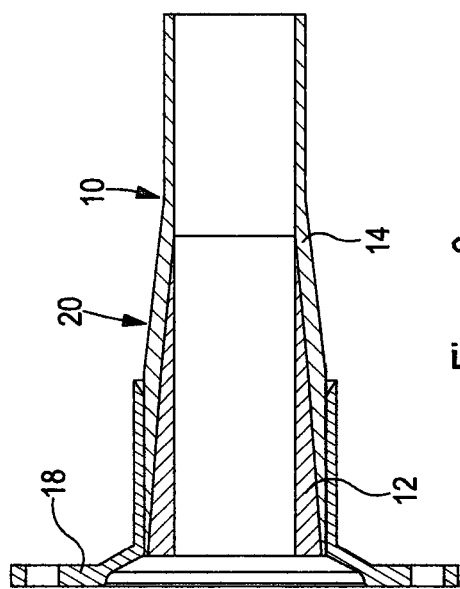

As illustrated in FIG. 1, a plug 16 of tubular or hoop like form is pushed into the end of the shaft 10 once removed from the mandrel M, and the aforementioned end fitting is then pushed onto the end part of the shaft 10, cooperating with the exposed fibres, the plug 16 bearing the compressive loads applied as a result of the presence of the end fitting 18 shown in FIGS. 3 and 4.

By manufacturing the shaft 10 in this manner, it will be appreciated that the wedge member 12 can be accurately manufactured to a desired shape and size, and then accurately positioned upon the mandrel before winding commences, thereby ensuring that the fibre material wound onto the mandrel and over the wedge member 12 adopts a desired configuration and position. Increased manufacturing accuracy, and hence reduced scrap levels can thus be achieved. Furthermore, the material of the wedge member 12 can be of greater stiffness than is achievable when a wedge shaped layer of fibre material is used to in the formation of the increased diameter shaping of the end part of the shaft. As a result, winding of the fibre material does not need to be compromised by the need to take into account the stiffness of the wedge shaped layer.

FIG. 2 illustrates an arrangement that is very similar to that of FIG. 1 but in which rather than provide a separate plug 16, the wedge member 12 is of increased thickness and provides, in use, the additional strength otherwise provided by the plug, thereby obviating the need to use a separate plug. The shape of the wedge member 12 may be chosen to achieve a desired 'plug' length and to achieve a desired wedge angle and length.

FIG. 3 illustrates a variant to the arrangement shown in FIG. 2, also showing the end component 18 fitted in position. As shown in FIG. 3, an annular groove 20 is cut into the outer surface of the shaft 10, in this case in a part of the shaft 10 axially aligned with part of the wedge member 12, although this is not critical to the invention. The purpose of the groove 20 is to define a region of the shaft 10 of controlled torque transmitting capacity. The torque transmitting capacity is controlled, by appropriate control over the dimensions and materials used in the manufacture of the shaft 10 and the dimensions of the groove 20, to ensure that the shaft 10 is capable of transmitting the torque that is expected to be carried in use, but to fail in the event that the applied torque exceeds this level by a predetermined amount. By arranging for the shaft 10 to fail in a controlled manner in the event that the applied torque is excessive it will be appreciated that damage to parts of the equipment to which the shaft is connected, in the event of an equipment failure, can be reduced.

The depth of the groove 20 may be such that it is located only in an outer layer of the shaft. Alternatively, it may extend into two or more layers of a multi-layered shaft.

In the arrangement of FIG. 3, the groove 20 serves as a 'fuse', the shaft 10 failing at the location of the groove 20 in the event that the applied torque becomes excessive. Whilst the provision of a groove 20 represents one way of achieving such a 'fuse', other techniques may be used to form the fuse. One option may be to modify the way in which the shaft 10 is formed to result in the formation of the groove, rather than by machining the groove into the finished, cured shaft. As shown in FIG. 4, another option may be to modify the manner in which the shaft 10 is manufactured to include a first or main part 22, and a pair of second or end parts 24. The first and second parts 22, 24 differ from one another in that the fibre angles used in the first part 22 are different to those used in the end parts 24 with the result that the torsional strengths of the first part is different to that of the second parts 24. By appropriate control over the winding of the fibre during the manufacture of the shaft 10, the second parts 24 can be manufactured in such a manner as to have a lower, but controlled, torsional strength than that of the first part 22 such that, in normal use when the applied torque is lower than a predetermined level, the shaft 10 can serve to transmit the torque between the end components 18, but that in the event that the applied torque exceeds the level capable of being transmitted by the second parts 24, one or other of the second parts 24 will fail.

In the arrangement illustrated, the second parts 24 are located at the ends of the shaft 10, and form the parts to which the components 18 are fitted. However, this need not always be the case, and other arrangements are possible without departing from the scope of the invention. Also, as illustrated, one of the second parts 24 is formed with a groove 20 serving as a fuse as described hereinbefore, but this need not be present. Furthermore, only a single second part 24 may be provided, if required.

Figure 5A:
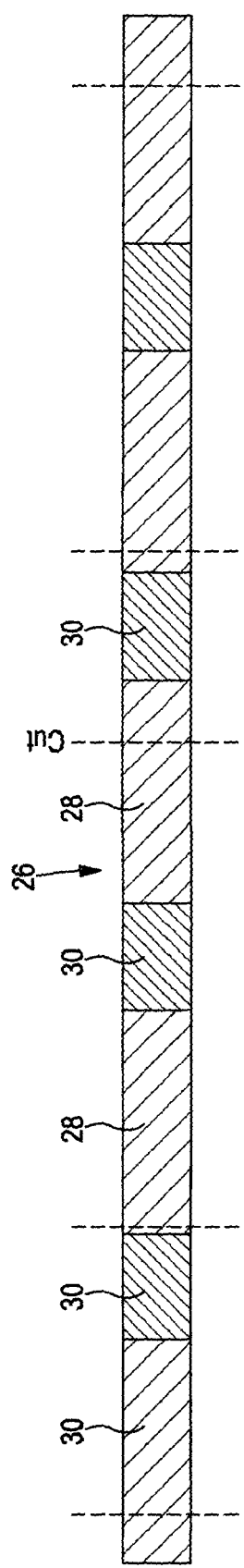
FIGS. 5a and 5b illustrate steps in the manufacture of another embodiment.
Figure 5B:
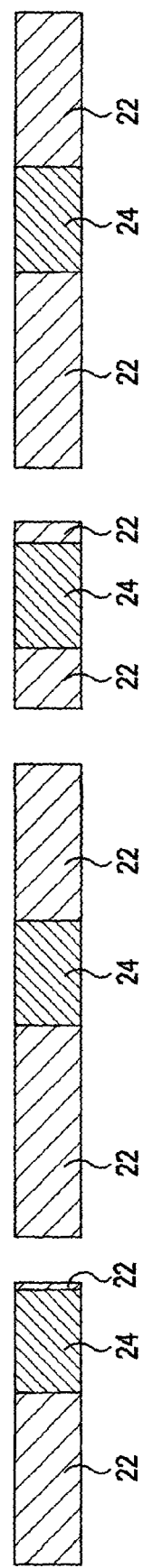

FIGS. 5a and 5b illustrate one way in which a shaft 10 of the general type shown in FIG. 4 may be manufactured. As shown in FIG. 5a, an elongate member 26 is manufactured by winding fibres onto a mandrel, the fibres being impregnated with a suitable matrix material that is allowed to cure to form an elongate composite tubular member. During the winding process, the winding angle is varied to as to form the elongate tubular member 26 with regions 28 of a relatively low winding angle separated by regions 30 with a relatively high winding angle. After formation of the member 26, a section 32 of the member 26 may be cut and used in the formation of a shaft 10 by securing end components 18 thereto. In the finished shaft 10, the regions 28 may form the first parts 22 of relatively high torsional strength, and the regions 30 may form the second parts 24 of relatively low torsional strength. It will be appreciated that the arrangement of FIGS. 5a and 5b may be used to form a shaft of substantially uniform outer diameter, rather than one having an increased outer diameter at its ends as in the arrangements of FIGS. 3 and 4.

Conveniently, as shown in FIG. 5a, the second regions 30 are evenly spaced apart, and the locations of the cuts dividing the member 26 into individual shafts 10 are chosen to ensure that each shaft 10 includes at least one first part 22 and at least one second part 24, the haft 12 being of a desired length.

One cause of failure of a composite material torque transmitting shaft arises from inter-lamina shear fatigue between the plies of the material that, in use, form the primary torque transmitting part of the shaft. In accordance with another embodiment of the invention, in order to reduce such failures, rather than form several plies with each ply having a single warp tow 32 interlaced with the weft tow 34 (see FIG. 6a), building up a plurality of such plies to achieve a desired thickness and strength, two or more partially or fully overlaid tows 32a, 32b are used to form warp tows 32 of increased thickness as shown in FIG. 6b. The increased thickness of the warp tows formed in this fashion result in the through thickness dimension d of the weft tow 34 being increased, and hence in the ply being of significantly greater thickness, thereby allowing a single ply to be used as the primary torque transmission layer. The increased thickness of the ply achieved in this manner does not require other winding parameters such as the fibre angle, material type or the like to be varied, and the increased ply thickness can be achieved without negatively impacting upon other properties of the shaft. As a single ply is used, it will be appreciated that issues arising from inter-lamina shear fatigue within the primary torque transmitting layer are overcome.

Figure 7:
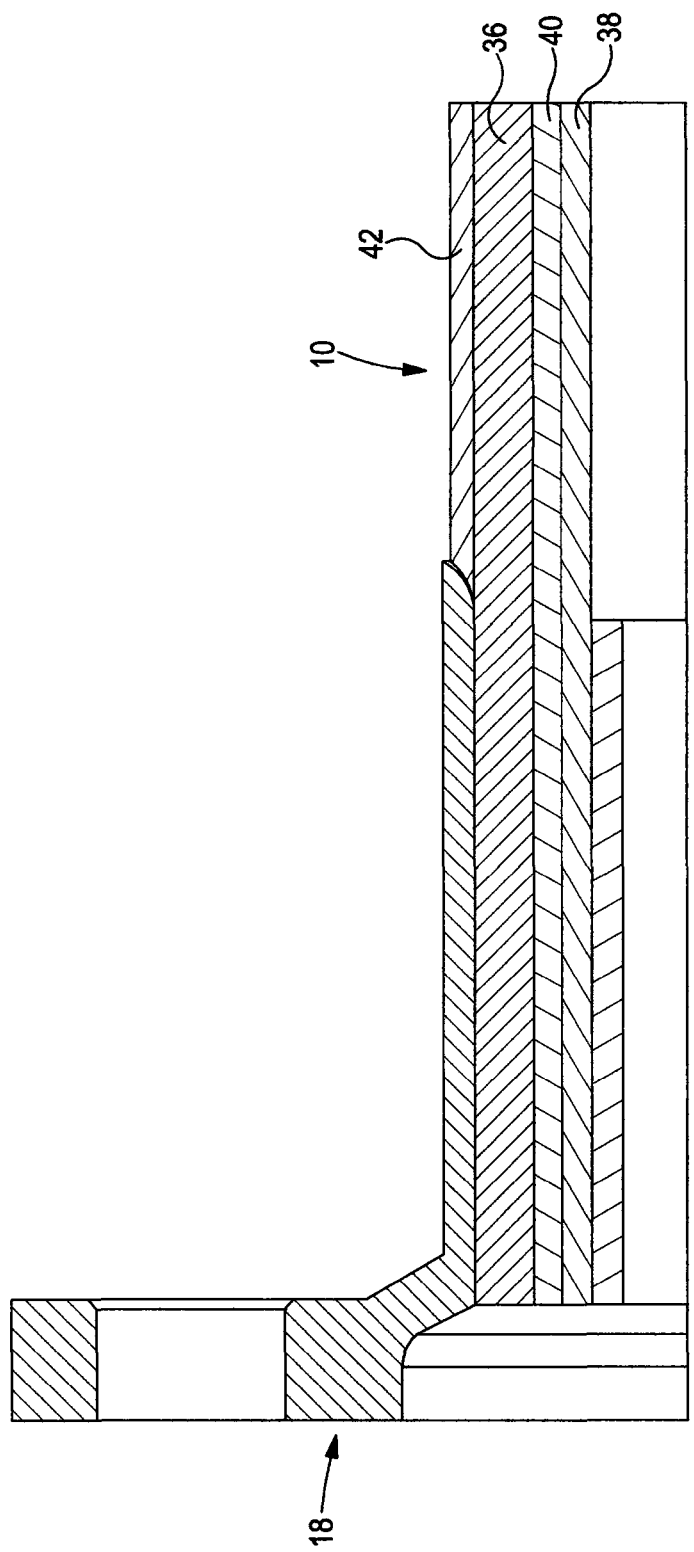
FIG. 7 illustrates a shaft incorporating the arrangement shown in FIG. 6b.

As shown in FIG. 7, the increased thickness primary torque transmitting layer 36 formed in this fashion is conveniently directly engaged by the end component 18, the layer 36 thus carrying the operational, fatigue and limit loadings, in use. The shaft 10 additionally includes impact plies 38, ultimate load plies 40 and low angle plies 42, but the shear loads between these layers, in normal use, are relatively low.

As mentioned hereinbefore, it is often desirable for the end parts of the shaft 10 to which the end components 18 are fitted to be of an increased outer diameter, and this may be achieved using, for example, a wedge member 12 as described hereinbefore or using the technique outlined in GB2424464. In accordance with another aspect of the invention, the outer diameter of the shaft 10 may be increased by modifying the fibre angle in the regions of the shaft 10 that are required to be of increased outer diameter. By increasing the fibre angle, without changing other parameters of the winding process, the overall diameter of the shaft 10 will be increased, achieving the desired shape or profile as illustrated in FIG. 8. As the increased diameter is achieved without modifying any of the other fibre or winding parameters and without the use of a wedge member 12 or the like, it will be appreciated that manufacture is relatively straightforward.

In the various arrangements described hereinbefore an end component is fitted to an end part of the shaft, the end component including a part that encircles part of the shaft and engages with the outer surface of the shaft. It is envisaged that in an alternative construction, an end component that includes a part located, in use, within an end part of the shaft may be used, the said part of the end component bearing against the inner surface of the shaft to allow the transmission of torque between the end component and the shaft, in use. It will be appreciated that where an end component that bears against the inner surface of the shaft is used, it may be preferred to modify the design of the shaft to ensure that the end component bears against the desired layer(s) of the shaft material for optimum torque transmission characteristics.

Whilst specific embodiments of the invention are described hereinbefore, it will be appreciated that a wide range of modifications and alterations may be made thereto without departing from the scope of the invention as defined by the appended claims.

The invention claimed is:

1. A method of manufacture of a shaft comprising; positioning a prefabricated metallic material annular wedge member onto a cylindrical mandrel, winding a fibre material onto the mandrel so that the fibre material extends over at least a part of the wedge member, allowing a matrix material impregnated into the fibre material to cure, machining away at least part of the fibre material to expose fibres thereof, and pushing an end fitting onto and around an end part of the shaft thereby applying a compressive load to the annular wedge member.

2. The method according to claim 1, wherein the annular wedge member is held captive by the fibre and matrix material of the shaft.

3. The method according to claim 1, further comprising the step of introducing a plug into the annular wedge member.

4. The method according to claim 3, wherein the plug is of tubular form.

5. The method according to claim 3, wherein the end fitting is of internally splined form, the splines of which cut into the material of the shaft upon the fitting of the end component to the shaft, the plug providing support for the end part of the shaft.

6. The method according to claim 1, further comprising the step of introducing part of the end fitting into the end part of the shaft such that the said part of the end fitting engages with an outer surface of the end part of the shaft.

* * * * *